US008819088B2

(12) United States Patent
Iyer et al.

(10) Patent No.: US 8,819,088 B2
(45) Date of Patent: Aug. 26, 2014

(54) IMPLEMENTING STORAGE MANAGEMENT FUNCTIONS USING A DATA STORE SYSTEM

(75) Inventors: Balakrishna Raghavendra Iyer, San Jose, CA (US); Lin S. Qiao, San Jose, CA (US); Aamer Sachedina, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 11/183,267

(22) Filed: Jul. 14, 2005

(65) Prior Publication Data

US 2007/0016548 A1    Jan. 18, 2007

(51) Int. Cl.
 G06F 7/00      (2006.01)
 G06F 17/30     (2006.01)
 G06F 9/26      (2006.01)
 G06F 9/34      (2006.01)

(52) U.S. Cl.
 USPC ........... 707/812; 707/822; 707/783; 711/202; 711/209; 711/218

(58) Field of Classification Search
 USPC ............... 707/5, 200, 201, 205, 712, 812, 707/821–831; 711/111, 112, 162, 4, 100, 711/202–203, 206, 208–209
 See application file for complete search history.

(56) References Cited

U.S. PATENT DOCUMENTS

| 4,467,421 A * | 8/1984 | White .......................... 711/118 |
| 5,561,566 A * | 10/1996 | Kigami et al. .................. 360/48 |
| 5,615,190 A * | 3/1997 | Best et al. .................. 369/53.41 |
| 5,987,478 A * | 11/1999 | See et al. ...................... 707/205 |
| 6,148,414 A * | 11/2000 | Brown et al. ..................... 714/9 |
| 6,295,619 B1 * | 9/2001 | Hasbun et al. ................ 714/719 |
| 6,389,425 B1 * | 5/2002 | DeMichiel et al. ........... 707/812 |
| 6,560,055 B1 * | 5/2003 | Nemazie et al. ................ 360/53 |
| 6,757,778 B1 * | 6/2004 | van Rietschote ................. 711/6 |
| 6,912,668 B1 * | 6/2005 | Brown et al. ..................... 714/6 |
| 7,058,788 B2 * | 6/2006 | Niles et al. ..................... 711/220 |
| 7,180,872 B2 * | 2/2007 | Bailey et al. .................. 370/252 |
| 7,340,581 B2 * | 3/2008 | Gorobets et al. .............. 711/202 |
| 7,715,243 B2 * | 5/2010 | Yamagami et al. ...... 365/189.05 |
| 2002/0188626 A1 * | 12/2002 | Tomita et al. ................. 707/205 |
| 2003/0070036 A1 * | 4/2003 | Gorobets ...................... 711/103 |
| 2004/0064449 A1 | 4/2004 | Ripley et al. |
| 2004/0243598 A1 | 12/2004 | Sleeper et al. |
| 2005/0063382 A1 * | 3/2005 | Fenner .......................... 370/389 |
| 2005/0080940 A1 * | 4/2005 | Flynn, Jr. ....................... 710/15 |

(Continued)

OTHER PUBLICATIONS

Security as a new dimension in embedded system design Srivaths Ravi, Paul Kocher, Ruby Lee, Gary McGraw, Anand Raghunathan Jun. 2004 Proceedings of the 41st annual conference on Design automation DAC '04 Publisher: ACM Press.*

Interposed Request Routing for Scalable Network Storage Darrell C. Anderson, Jeffrey S. Chase, and Amin M. VahDat Duke University February 2002 ACM Transactions on Computer Systems (TOCS), vol. 20 Issue 1 Publisher: ACM Press.*

(Continued)

Primary Examiner — Sherief Badawi
Assistant Examiner — Berhanu Mitiku
(74) Attorney, Agent, or Firm — Janaki K. Davda; Konrad, Raynes, Davda & Victor LLP

(57) ABSTRACT

Techniques are provided for accessing sector data. An embedded storage function is received. One or more data management functions are generated in response to receiving the embedded storage function. The one or more data management functions are invoked to retrieve the sector data from a sector table.

23 Claims, 10 Drawing Sheets

(56) References Cited

U.S. PATENT DOCUMENTS

| | | | |
|---|---|---|---|
| 2005/0132127 A1* | 6/2005 | Chung et al. | 711/103 |
| 2005/0169045 A1* | 8/2005 | Yamagami et al. | 365/158 |
| 2007/0076507 A1* | 4/2007 | Yamagami et al. | 365/230.01 |

OTHER PUBLICATIONS

Storage Use Analysis and its Applications Manuel Serrano, Marc Feeley Jun. 1996 ACM SIGPLAN Notices, Proceedings of the first ACM SIGPLAN international conference on Functional programming ICFP '96, vol. 31 Issue 6.*

An Evaluation of Multi-resolution Storage for Sensor Networks Feb. 2002 ACM Transactions on Computer Systems (TOCS), vol. 20 Issue 1 Publisher: ACM Press.*

Ravi et al. Security as a new dimension in embedded system design Jun. 2004 Proceedings of the 41st annual conference on Design automation DAC '04 Publisher: ACM Press.*

Anderson et al. Interposed Request Routing for Scalable Network Storage Duke University, Feb. 2002 ACM Transactions on Computer Systems (TOCS), vol. 20 Issue 1 Publisher: ACM Press.*

Serrano et al. Storage Use Analysis and its Applications Jun. 1996 ACM SIGPLAN Notices, Proceedings of the first ACM SIGPLAN international conference on Functional programming ICFP '96, vol. 31 Issue 6.*

Gansesan an Evaluation of Multi-resolution Storage for Sensor Networks Feb. 2002 ACM Transactions on Computer Systems (TOCS), vol. 20 Issue 1 Publisher: ACM Press.*

Markatos et al. "Web-Conscious Storage Management for Web Proxies" IEEE/ACM Transactions on Networking, vol. 10, No. 6, Dec. 2002.*

Rosenblum, M., and J.K. Ousterhout, "The Design and Implementation of a Log-Structured File System", Proceedings of the 13th ACM Symposium on Operating Systems Principles, Jul. 24, 1991, pp. 1-15.

Storage Performance Council, "Storage Performance Council Home Page", [online], 2008, [retrieved on Jan. 4, 2008], retrieved from the Internet at <URL: http://www.storageperformance.org/home>, 4 pp.

Steegmans, B., M. Samson, and M. Shah, "DB2 Recovery Expert for Multiplatforms", IBM Redbooks, First Edition, Nov. 2002, 300 pp.

Aguilera, M.K., M. Ji, M. Lillibridge, J. MacCormick, E. Oertli, Dave Anderson, M. Burrows, T. Mann, & C.A. Thekkath, "Block-Level Security for Network-Attached Disks", Proceedings of FAST '03: 2nd USENIX Conference on File and Storage Technologies, Mar. 31-Apr. 2, 2003, pp. 159-173.

Attanasio, C.R., M. Butrico, C.A. Polyzois, S.E. Smith, & J.L. Peterson, "Design and Implementation of a Recoverable Virtual Shared Disk", IBM Research Report, RC 19843, 1994, pp. 1-18.

Bamford, R., D. Butler, B. Klots, & N. MacNaughton, "Architecture of Oracle Parallel Server", Proceedings of the $24^{th}$ VLDB Conference, 1998, pp. 669-670.

Baru, C., G. Fecteau, A. Goyal, H. Hsiao, A. Jhingran, S. Padmanabhan, & W. Wilson, "An Overview of DB2 Parallel Edition", Proceedings of the 1995 ACM SIGMOD international conference on Management of data, 1995, pp. 460-462.

Bhattacharya, S., C. Mohan, K.W. Brannon, I. Narang, H. Hsiao, & M. Subramanian, "Coordingating Backup/Recovery and Data Consistency Between Database and File Systems", Proceedings of the 2002 ACM SIGMOD international conference on Management of data, 2002, pp. 500-511.

Burrows, M., C. Jerian, B. Lampson, & T. Mann, "On-line Data Compression in a Log-structured File System", Apr. 15,1992, pp. 1-21.

Byu, "Byu Trace Distribution Center", [online], 2001, [Retrieved on Jul. 14, 2005], Retrieved from the Internet at <URL: http://tds.cs.byu.edu/tds/>.

Chen, P.M., E.K. Lee, G.A. Gibson, R.H. Katz, & D.A. Patterson, "Raid: High-Performance, Reliable Secondary Storage", Technical Report: CSD-93-778, 1993, pp. 1-66.

Craft, D.J., "A Fast Hardware Data Compression Algorithm and Some Algorithmic Extensions", [online], Journal of Research and Development, vol. 42, No. 6, 1998.

Goldstein, J., R. Ramakrishnan, & U. Shaft, "Compressing Relations and Indexes", Proceedings of the Fourteenth International Conference on Data Engineering, 1998, pp. 370-379.

Graefe, G. & L.D. Shapiro, "Data Compression and Database Performance", Proceedings of the ACM/IEEE Computer Science Symposium on Applied Computing, 1991, pp. 1-10.

Hacigumus, H., B. IYER, & Mehrota, "Providing Database as a Service", Proceedings of the 18th International Conference on Data Engineering (ICDE'02), 2002.

Hsu, W.W., a.J. Smith, & H.C. Young, "I/O Reference Behavior of Production Database Workloads and the TPC Benchmarks—An Analysis at the Logical Level", Report No. UCB/CSD-99/1071, Nov. 1999, pp. 1-37.

Iyer, B.R. & D. Wilhite, "Data Compression Support in Database", Proceedings of the $20^{th}$ VLDB Conference, 1994, pp. 695-704.

Kemme, B. & G. Alonso, "Don't Be Lazy, Be Consistent: Postgres-R, A New Way to Implement Database Replication", Proceedings of the $26^{th}$ VLDB Conference, 2000, pp. 134-143.

Kleewein, J., "Practical Issues with Commercial use of Federated Databases", Proceedings of the $22^{nd}$ VLDB Conference, 1996, p. 580.

Lumb, C.R., A. Merchant, & G.A. Alvarez, "Facade: Virtual Storage Devices with Performance Guarantees", Proceedings of FAST '03: $2^{nd}$ USENIX Conference on File and Storage Technologies, Mar. 31-Apr. 2, 2003, pp. 131-144.

Martin, P., W. Powley, H. Li, & K. Romanufa, "Managing Database Server Performance to Meet QoS Requirements in Electronic Commerce Systems", International Journal on Digital Libraries, vol. 3, No. 4, 2002, pp. 316-324.

Miller, E.L., "Input/Output Behavior of Supercomputing Applications", Dec. 14, 1990.

Patterson, H., S. Manley, M. Federwisch, D. Hitz, S. Kleiman, & S. Owara, "SnapMirror: File System Based Asynchronous Mirroring for Disaster, Recovery", Proceedings of the FAST 2002 Conference on File and Storage Technologies, Jan. 2002.

Poess, M. & D. Potapov, "Data Compression in Oracle", Proceedings of the $29^{th}$ VLDB Conference, 2003.

Quinlan, S. & S. Dorward, "Venn: A New Approach to Archival Storage", Proceedings of the FAST 2002 Conference on File and Storage Technologies, Jan. 2002.

Rajasekar, A., M. Wan, R. Moore, G. Kremenek, & T. Guptil, "Data Grids, Collections, and Grid Bricks", Proceedings of the 20 th IEEE/ 11 th NASA Goddard Conference on Mass Storage Systems and Technologies (MSS'03), 2003.

Sanrad, "Sanrad White Paper: V-Switch 3000- Storage Virtualization", WP 001-04, 2003, pp. 1-24.

Sleepycat Software, "Berkley DB Data Store", [online], 2005, [Retrieved on Jul. 14, 2005], Retrieved from the Internet at <URL: http://www.sleepcat.com/products/data/shtml>.

Teigland, D. & H. Mauelshagen, "Volume Managers in Linux", Proceedings of the FREENIX Track: 2001 USENIX Annual Technical Conference, 2001, pp. 185-197.

U.S. Appl. No. 10/958,954, filed Oct. 5, 2004, titled "Apparatus, System, and Method for Supporting Storage Functions Using an Embedded Database Management System", invented by J.T. Flynn Jr. and B.R. Iyer.

IBM Corporation, "Application Development Guide: Programming Client Applications", IBM DB2 Universal Database, Reference No. SC09-4826-00, Chapters 1-10, Copyright 1993-2002, pp. 1-306.

IBM Corporation, "Application Development Guide: Programming Client Applications", IBM DB2 Universal Database, Reference No. SC09-4826-00, Chapters 11-end of book, Copyright 1993-2002, pp. 307-549.

IBM Corporation, "System Programming Reference", IBM MVS/DFP Version 3 Release 3, Reference No. SC26-4567-2, Copyright1985, 1991, pp. 1-312.

Laurent Vanel et al., "AIX Logical Volume Manager, from A to Z: Introduction and Concepts", IBM Corporation, Redbooks reference No. SG24-5432-00, Copyright 2000, pp. 1-420.

* cited by examiner

IMPLEMENTING STORAGE MANAGEMENT FUNCTIONS USING A DATA STORE SYSTEM

BACKGROUND

1. Field

Embodiments of the invention relate to implementing storage management functions using a data store system.

2. Description of the Related Art

A storage subsystem may be described as including one or more host computers and one or more storage servers. The storage servers provide the host computers access to storage, such as disk. A disk may be partitioned into tracks, which are partitioned into sectors.

Modern storage subsystem users are demanding advanced functions, such as point-in-time recovery, continuous bidirectional replication, encryption, etc. Older storage subsystems have supported data compression, a feature liked by users, but not supported in some recent storage subsystems. Also, storage subsystems are increasingly being built on top of general purpose computers, hence scalability, reliability, and recoverability for hardware and software failures are also needed. It takes significant time to develop and integrate new features in storage subsystems.

A storage controller is part of a storage subsystem and includes a storage virtualization engine that take sectors from a plurality of physical disks and makes them available to one or more host processors at host computers as sectors of a plurality of "virtual" disks, which is analogous to logical memory for multiprocessing host computers. The storage virtualization engine maintains and manages the mapping of sectors from physical to logical disks. Input/Output (I/O) commands are made to logical disk sectors and sent to the storage virtualization engine. The storage virtualization engine redirects the I/O commands to the appropriate sector on a physical disk. In some implementations, a hardware cache, managed by the storage virtualization engine, is a front end for the physical disks, and I/O commands may be serviced from the cache. Storage virtualization engine are described in IBM Corp. Application Development Guide: Programming Client Applications. IBM Redbooks, 2002, which is incorporated by reference herein in its entirety.

A Relational DataBase Management System (RDBMS) uses relational techniques for storing and retrieving data in a relational database. Relational databases are computerized information storage and retrieval systems that are organized into tables that consist of records and columns of data. The records may be called tuples or records. A database typically has many tables, and each table typically has multiple records and multiple columns. A client computer typically issues requests to a server that includes a RDBMS. The RDBMS provides the client computer access to storage (e.g., a relational database).

RDBMS software may use a Structured Query Language (SQL) interface. The SQL interface has evolved into a standard language for RDBMS software and has been adopted as such by both the American National Standards Institute (ANSI) and the International Standards Organization (ISO).

In some systems, a relational database engine consists of the following software components: (i) a network communications manager component, (ii) a query management component, (iii) a record management component, and (iv) a page buffer management component.

In conventional systems, a source of performance overhead is found in client computer-server processing, which is handled by the network communications manager component and the query management component. In particular, the client computers and servers may reside on a multiplicity of operating systems and/or processor platforms. Representation of basic data types (e.g., integers) may be different on different platforms. An RDBMS may be capable of concurrently servicing requests from client computers running on various platforms. Hence, the network communications manager component has a rich set of translation capabilities to mask the impact of the variations between platforms on the result of database operations conducted by the client computer or server.

Queries (e.g., in the form of SQL statements) are processed by the query management component. The queries may be parsed and tokenized before being sent to the RDBMS. The tokens are retrieved and transformed into data structure elements that are used to drive query processing. When an SQL query arrives at an RDBMS server, the SQL query is analyzed, and the most optimum way to execute the SQL query is determined. Then, run time structures needed to drive the RDBMS record management component are constructed. The record management component is driven with these initialized data structures. Query analysis, query optimization, and setting up of the run time data structures consume CPU overhead.

U.S. patent application entitled "Apparatus, System, and Method for Supporting Storage Functions Using an Embedded Database Management System", having application Ser. No. 10/958,954, and filed on Oct. 5, 2004 (referred to hereinafter as the '954 application), is incorporated by reference herein in its entirety. The '954 application described a table module with a first field containing a storage identifier and a second field having data contents. The table module is configured to emulate a virtual storage device and maintain a plurality of records.

The data present on logical disks (i.e., identified by Logical Unit Numbers (LUNs)), as well as on the physical disks, may be represented as sector vectors. A sector vector may be described as a set of consecutive sectors. A sector vector may be stored in a table. In addition, compression and encryption render fixed length sectors into variable sized compressed or encrypted sectors. When sectors are stored in records of tables, compression and encryption result in variable length records stored in the tables. Two techniques for tackling the problems of variable length records include a log structure array approach and a DBMS-based approach. The log structure array approach appends every updated or newly created sector to the end of the sector vector, while simultaneously reclaiming space left by holes (M. Rosenblum and J. K. Ousterhout, "The Design and Implementation of a Log-Structured File System", ACM Transactions on Computer Systems, V 10, No. 1, pages 26-52, 1992, which is incorporated by reference herein in its entirety). The DBMS-based approach introduces some extra space for a set of variable length sectors to accommodate changes in the size of a sector. This maintains the sequentiality of records better than a log structured array. This feature is important for commercial and scientific applications that are known to have highly sequential I/O reference patterns (International Business Machines Corporation, MVS/DFP V3R3 System Programming Reference, IBM Redbooks, 1996; M. Poess and D. Potapov, Data Compression in Oracle, In International Conference on Very Large Data Bases, pages 937-947, 2003; which are incorporated by reference herein in their entirety), and the expectation of these applications are better preserved by maintaining sequentiality.

Since the compressed sectors have variable length, and the location of the sectors may vary over time, indirection may be used to locate the compressed sectors. Therefore, an index is built on sector numbers (i.e., that correspond to logical sector numbers of sectors in logical storage) using intrapage indirection (i.e., the forward address in the data page serves as the technique for access). The forward address allows records to be moved around in pages without changing the index. The execution of a SQL operation, therefore, picks the access path through the index to access the data. An index is usually structured as a B-tree, and CPU overhead of navigating a B-tree may be large. This happens when the I/O size is not large, and therefore the B-tree traversal cost is much larger than index page access through the leaf page links; or when the size of the virtual sector vector changes, referred to as LUN resizing. The change in LUN size may be significant. The change in LUN size may result in a large amount of insertion and deletion of table records. Thus, extensive amount of B-tree non-leaf node splits and merges may be observed during the LUN resizing. From the above concerns, reducing index operation cost becomes important.

Thus, there is a need in the art for implementing storage management functions in a data store system, such as an RDBMS.

SUMMARY

Provided are a method, article of manufacture, and system for accessing sector data. An embedded storage function is received. One or more data management functions are generated in response to receiving the embedded storage function. The one or more data management functions are invoked to retrieve the sector data from a sector table.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of embodiments of the invention.

Figure 1:
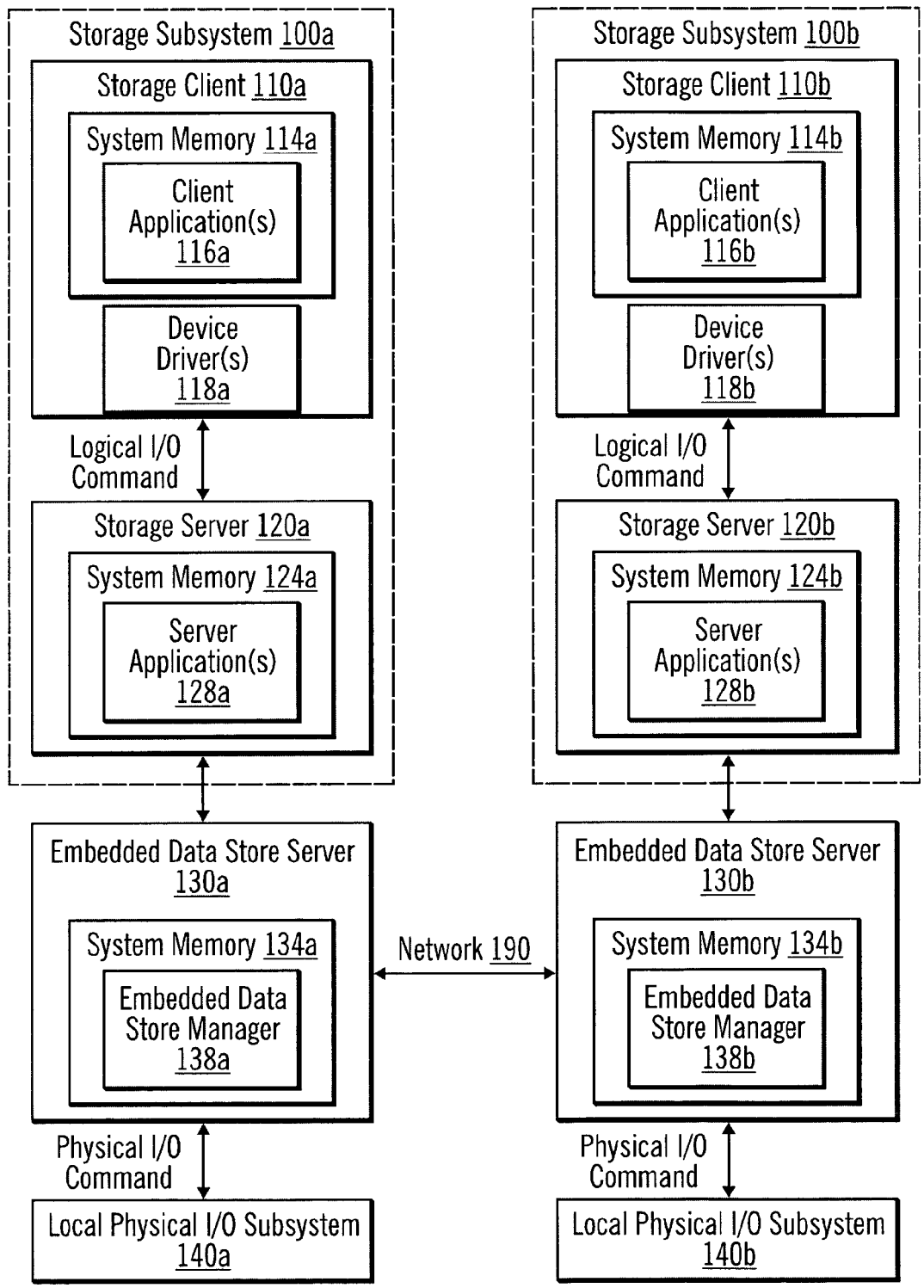
FIG. 1 illustrates details of a computer architecture in which certain embodiments may be implemented.

FIG. 1 illustrates details of a computer architecture in which certain embodiments may be implemented. A storage subsystem 100a includes a storage client 10a and a storage server 120a. The storage client 110a is coupled to the storage server 120a. The storage client 110a includes system memory 114a, which may be implemented in volatile and/or non-volatile devices. One or more client applications 116a (i.e., computer programs) are stored in the system memory 114a for execution by a processor (e.g., a Central Processing Unit (CPU)) (not shown). The storage client 110a also includes one or more device drivers 1118a.

The storage server 120a includes system memory 124a, which may be implemented in volatile and/or non-volatile devices. One or more server applications 128a (i.e., computer programs) are stored in the system memory 124a for execution by a processor (e.g., a Central Processing Unit (CPU)) (not shown).

The storage server 120a is coupled to an embedded data store server 130a. The embedded data store server 130a includes system memory 134a, which may be implemented in volatile and/or non-volatile devices. An embedded data store manager 138a (i.e., a computer program) is stored in the system memory 134a for execution by a processor (e.g., a Central Processing Unit (CPU)) (not shown).

The data store manager 130a is coupled to a local physical I/O subsystem 140a. The local physical I/O subsystem 140a may be described as storage.

A storage subsystem 100b includes a storage client 110b and a storage server 120b. The storage client 110b is coupled to the storage server 120b. The storage client 110b includes system memory 114b, which may be implemented in volatile and/or non-volatile devices. One or more client applications 116b (i.e., computer programs) are stored in the system memory 114b for execution by a processor (e.g., a Central Processing Unit (CPU)) (not shown). The storage client 110b also includes one or more device drivers 118b.

The device drivers 118a, 118b issue logical I/O commands on behalf of the storage clients 110a, 110b.

The storage server 120b includes system memory 124b, which may be implemented in volatile and/or non-volatile devices. One or more server applications 128b (i.e., computer programs) are stored in the system memory 124b for execution by a processor (e.g., a Central Processing Unit (CPU)) (not shown).

The storage server 120b is coupled to an embedded data store server 130b. The embedded data store server 130b includes system memory 134b, which may be implemented in volatile and/or non-volatile devices. An embedded data store manager 138b (i.e., a computer program) is stored in the system memory 134b for execution by a processor (e.g., a Central Processing Unit (CPU)) (not shown).

The data store manager 130b is coupled to remote physical I/O subsystem 140b. The remote physical I/O subsystem 140b may be described as storage.

Network 190 connects embedded data store server 130a to embedded data store server 130b. The network 190 may comprise any type of network, such as, for example, a Storage Area Network (SAN), a Local Area Network (LAN), Wide Area Network (WAN), the Internet, an Intranet, etc.

In alternative embodiments, the computer programs may be implemented as hardware, software, or a combination of hardware and software.

The storage clients 110a, 110b, storage servers 120a, 120b, and embedded data store servers 130a, 130b may comprise any computing device known in the art, such as a server, mainframe, workstation, personal computer, hand held computer, laptop telephony device, network appliance, etc.

The storage servers 120a, 120b may also be referred to as storage controllers.

The local physical I/O subsystem 140a and remote physical I/O subsystem 140b each may comprise an array of storage devices, such as Direct Access Storage Devices (DASDs), Just a Bunch of Disks (JBOD), Redundant Array of Independent Disks (RAID), virtualization device, etc. Note that the terms "local" and "remote" refer to the relative locations of the subsystems. For example, remote physical I/O subsystem 140b is located remotely from local physical I/O subsystem 140a, but may not be located remotely from embedded data store server 130b.

In certain embodiments, the embedded data store managers 138a, 138b are RDBMSs.

In certain embodiments, a storage client (e.g., 110a) issues a logical I/O command to a corresponding storage server (e.g., 120a). The storage server invokes an embedded data store manager (e.g., 130a) to process the logical I/O command. The embedded data store manager converts the logical I/O command into a physical I/O command. If the I/O command is directed to local storage, the embedded data store manager routes the physical I/O command to a local physical I/O subsystem (e.g., 140a) to process the physical I/O command. If the I/O command is directed to remote storage; the embedded data store manager routes the physical I/O command to a remote embedded data store manager (e.g., 130b), which then routes the I/O command to a remote physical I/O subsystem (e.g., 140b) to process the physical I/O command.

Although the storage subsystems 100a, 100b are shown as each including one storage client and storage server, each storage subsystem 100a, 100b may include one or more client computers and one or more storage servers.

Figure 2:
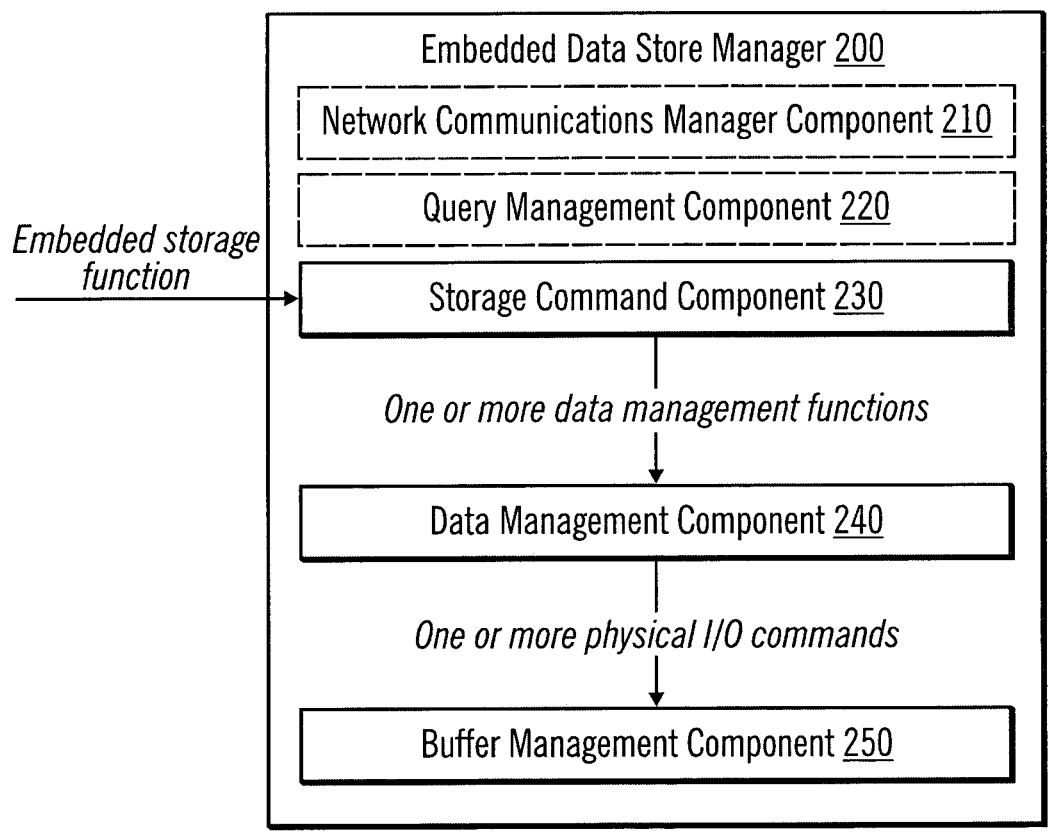
FIG. 2 illustrates further details of an embedded data store manager in accordance with certain embodiments.

FIG. 2 illustrates further details of an embedded data store manager 200 in accordance with certain embodiments. Embedded data store managers 138a, 138b may implement the architecture of embedded data store manager 200. The embedded data store manager 200 includes a network communications manager component 210, a query management component 220, a storage command component 230, a data management component 240, and a buffer management component 250. The storage command component 230 receives an embedded storage function, generates one or more data management functions, and forwards the one or more data management functions to the data management component 240. The data management component 240 generates one or more physical I/O commands, and forwards these physical I/O commands to the buffer management component 250. The buffer management component 250 interacts directly with physical storage and executes the one or more physical I/O commands.

The data management component 240 and buffer management component 250, in effect, virtualize file storage as storage for records of tables. When tables are defined on "raw" storage (i.e., on storage that does not contain file system data), the embedded data store manager 200 acts analogous to a storage virtualization engine in a storage subsystem.

Embedding a Storage Command Component into the Data Store Manager

The embedded data store manager 200 implements desired storage management features. The embedded data store manager 200 may be said to be "embedded" behind a storage subsystem interface. In particular, embodiments embed a storage command component 230 inside the embedded data store manager 138a, 138b. Then, storage client 110a, 110b logical I/O commands issued to the storage server 120a, 120b are mapped by the storage server 120a, 120b to embedded storage function calls that are processed by the storage command component 230, data management component 240, and buffer management component 250, thereby exploiting and exporting some data store manager functions and features as storage subsystems functions and features. The embedded storage functions are provided by embodiments of the invention.

Figure 3:
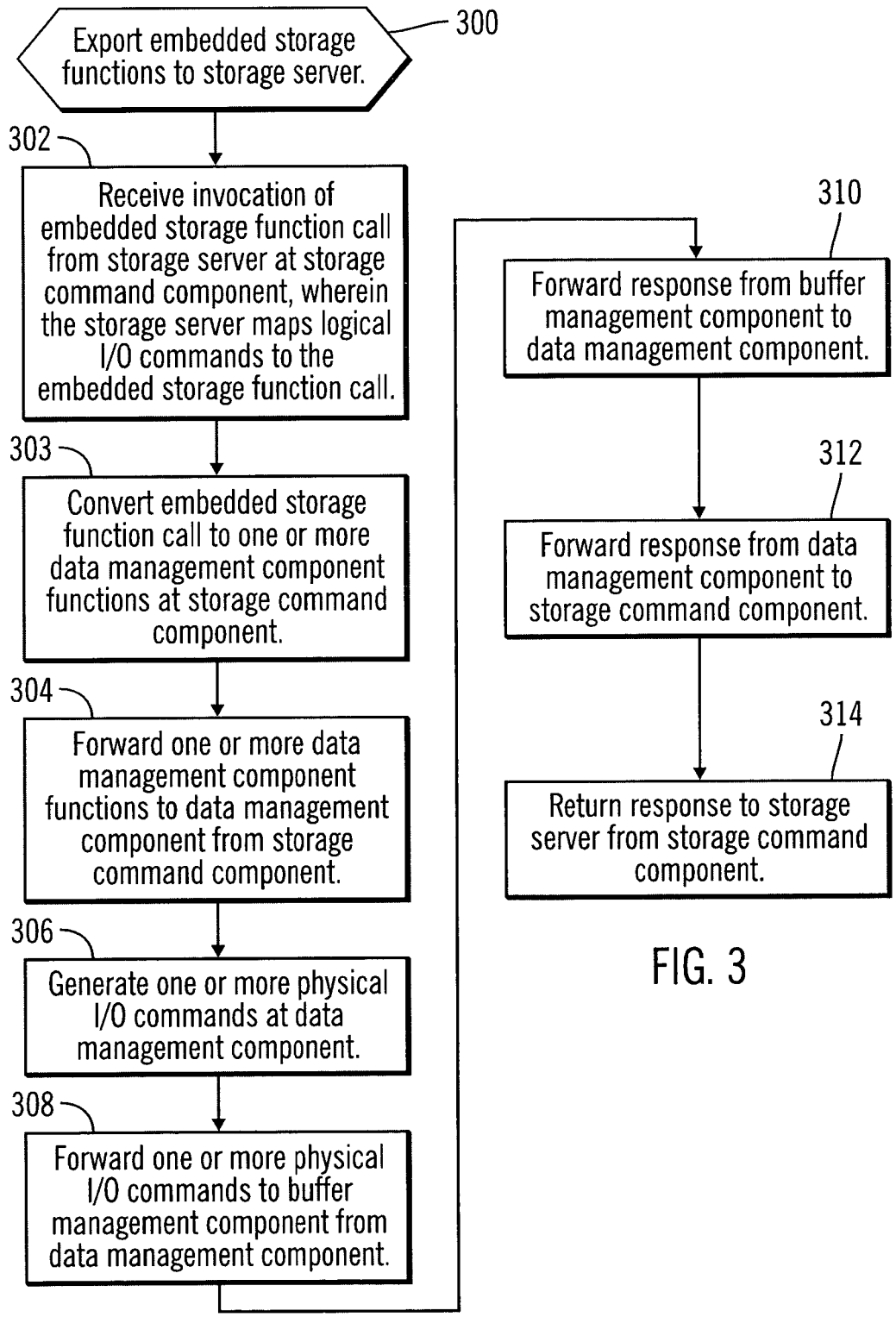
FIG. 3 illustrates logic for embedding a storage command component into an embedded data store manager in accordance with certain embodiments.

FIG. 3 illustrates logic for embedding a storage command component 230 into the embedded data store manager 138a, 138b in accordance with certain embodiments. I/O commands read or write one or a set of sequentially addressed sectors. A sector consists of binary uninterpreted data (i.e., data in binary format that has not been interpreted by file systems or applications). Unlike other data types (e.g., integers), no transformations are necessary on this binary data. The binary data is interpreted identically on all storage client processors.

In FIG. 3, control begins at block 300 with the data management component 240 exporting embedded storage functions to the storage server 120a, 120b. When a logical I/O command generated by a storage client 110a, 110b arrives at the storage server 120a, 120b, the storage server 120a, 120b maps the logical I/O command to an embedded storage function and issues an embedded storage function call to the storage command component 230 within the embedded data store manager 138a, 138b.

Continuing with FIG. 3, in block 302, the storage command component 230 receives the embedded storage function call from the storage server 120a, 120b. The storage command component 230 knows how to respond to such a call. For a read I/O function call, the storage command component 230 extracts the desired records from a data store (e.g., a database). For a write I/O function call, the storage command component 230 takes the data in the function call and updates relevant records in a data store (e.g., a database). Because the embedded storage function calls are directed to the storage command component 230, embodiments avoid invoking the network communications manager component 210 and query management component 220, which reduces overhead. In this manner, using the embedded data store manager 138a, 138b to support storage virtualization reduces overhead.

In block 303, the storage command component 230 converts the embedded storage function call to one or more data management functions. For example, an embedded storage function call for an I/O read command is converted into one or more data management functions that access the right records and return the sectors from the records to the caller. As another example, an embedded storage function call for an I/O write command is converted into one or more data management functions that update corresponding records with input data from a caller that issued the I/O write command.

In block 304, the one or more data management functions are forwarded from the storage command component 230 to the data management component 240. In block 306, the data management component 240 generates one or more physical I/O commands. In block 308, the data management component 240 forwards the one or more physical I/O commands to the buffer management component 250. In block 310, the buffer management component 250 forwards a response (e.g., data for a physical read I/O command or status for a physical write I/O command) to the data management component 240. In block 312, the data management component 240 forwards the response to the storage command component 230. In block 314, the storage command component returns the response to the storage server 120a, 120b.

Thus, an I/O command is translated into one or more embedded data store manager 138a, 138b internal function calls, and passed from the logical storage subsystem to the embedded data store manager 138a, 138b. The embedded data store manager 138a, 138b further accesses physical storage, manipulates data, and replies to the storage server 120a, 120b (i.e., the I/O initiator). I/O commands from the device drivers of the storage clients 110a, 110b are initiated by a special set of commands (e.g., in certain embodiments, these are SCSI commands). In certain embodiments, the I/O command format described in the Small Computer System Interface (SCSI) standard is followed, and SCSI I/O commands are mapped to a set of the embedded storage function calls. Merely to enhance understanding, read and write function calls will be described herein, but embodiments are applicable to other function calls.

In certain embodiments, the storage command component 230 implements the Internet Small Computer Systems Interface (iSCSI) protocol. This is an instantiation of the idea of exploiting the embedded data store server 130a, 130b to provide storage functionality. In certain embodiments, the embedded data store server 130a, 130b is coupled to an iSCSI target, which acts as the storage server 120a, 120b.

Figure 4:
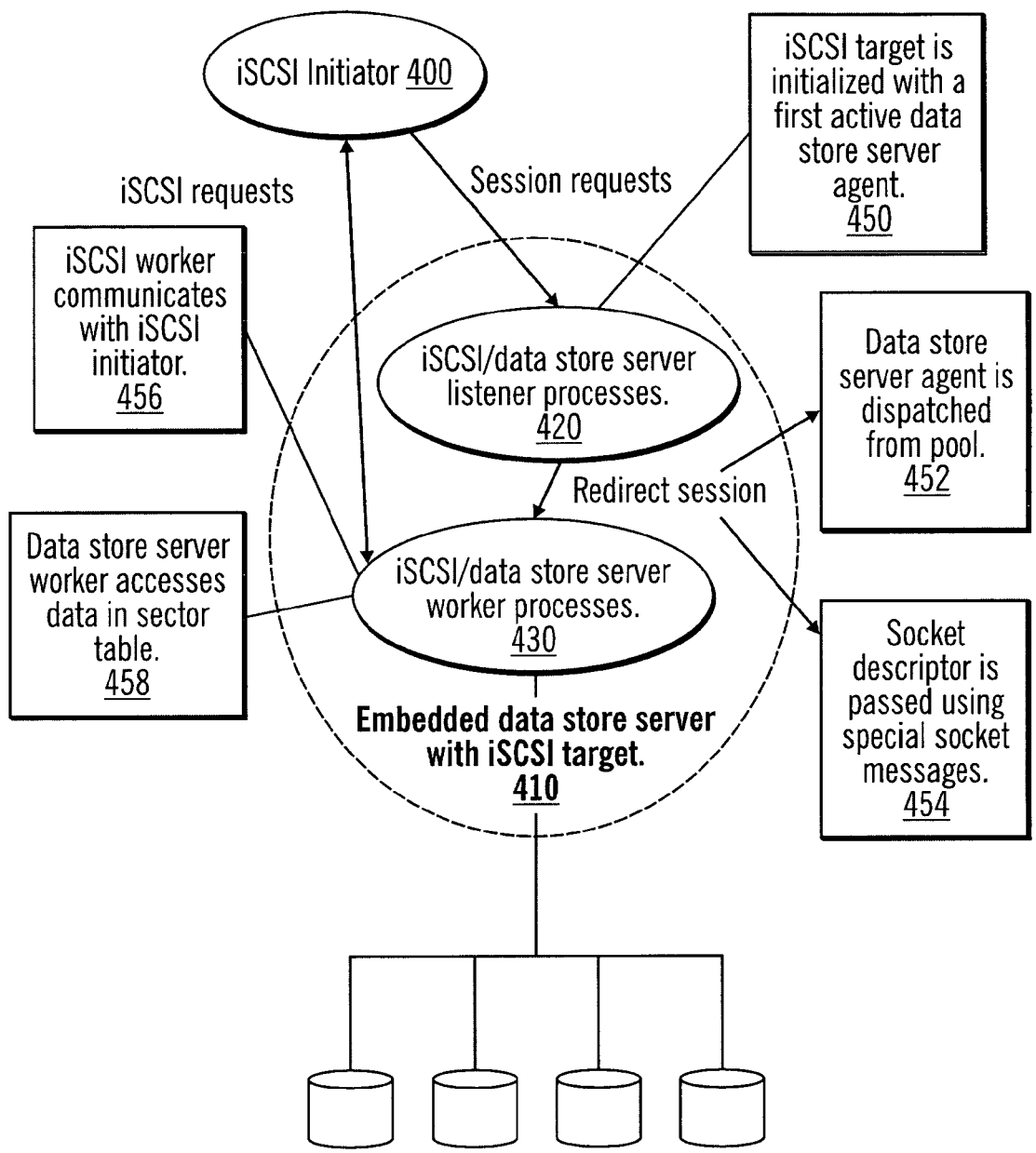
FIG. 4 illustrates an iSCSI implementation in accordance with certain embodiments.

FIG. 4 illustrates an iSCSI implementation in accordance with certain embodiments. As depicted in FIG. 4, an iSCSI target is tightly integrated into an embedded data store server, and these two are illustrated as embedded data store server with iSCSI target 410. The iSCSI target may be described as a storage server. The iSCSI initiator 400 may be described as a storage client that is coupled to the embedded data store server with iSCSI target 410. The embedded data store server with iSCSI target 410 includes two agents: an iSCSI and data store server listener process agent 420 and an iSCSI and data store server worker processes agent 430.

In block 450, the iSCSI target is initialized when a first data store server agent (e.g., 420) is activated, and a data store server listener process is waiting on a port for coming session requests. The iSCSI initiator 400 sends session requests to the iSCSI portion of the listener process 420. Upon receiving a new session request, a worker process is dispatched from a pool of worker processes 430 (block 452), and the session handle (i.e., socket descriptor) is directed to a new data store server agent via a special socket message (block 454). After receiving the socket descriptor for the session, the iSCSI worker embedded in the data store server agent is responsible for the communication between the iSCSI initiator and the iSCSI portion of the worker process (block 456), while the data store server portion of the worker process of the data store server agent retrieves/updates data from/to a sector table described in FIG. 5 (block 458). The following pseudocode provides an example of an iSCSI protocol implementation:

```
1) Initialize iSCSI target listener process.
    Initialize_memory( );
    Dispatch_DB_process(..., "iscsi_target_listener", ...); //invoke
a new data store server process with iSCSI target listener
    Destruct_memory( ); //In the new data store server process, a new
iSCSI target listener is started, listening on a port waiting for connection.
2) Dispatch an iSCSI/data store server worker process
    iscsi_sock_accept(......)
    Initialize_memory( );
    Dispatch_DB_process(..., "iscsi_target_worker", ...); //invoke
a new data store server process with iSCSI target worker
    Destruct_memory( );
```

In the data store server worker process, the iSCSI target worker takes over the socket handle and processes I/Os from the iSCSI initiator.

The socket descriptor is passed from the iSCSI portion of the listener process 420 to the iSCSI portion of a worker process (from the pool of worker processes 430). The iSCSI portion of the listener process 420 sends the socket descriptor using a send_connection call, and the iSCSI portion of the worker process waits for the socket descriptor using a receive_fd call. The send_connection function takes the session socket handle as the input, constructs a special message containing the socket id, and delivers the message to the socket between the iSCSI portion of the listener process 420 and the iSCSI portion of the worker process. The receive_fd function waits on the socket between the iSCSI portion of the listener process 420 and the iSCSI portion of the worker process processes, until the function receives a message. The receive_fd function unwraps the message and returns the session socket handle. The following pseudocode provides an example implementation:

```
static int send_connection(int fd)
{
  struct msghdr msg;
  char ccmsg[CMSG_SPACE(sizeof(fd))];
  struct cmsghdr *cmsg;
  struct iovec vec;
  char *str = "x";
  int rv;
  msg.msg_name = (struct sockaddr*)&unix_socket_name;
  msg.msg_namelen = sizeof(unix_socket_name);
  vec.iov_base = str;
  vec.iov_len = 1;
  msg.msg_iov = &vec;
  msg.msg_iovlen = 1;
  msg.msg_control = ccmsg;
  msg.msg_controllen = sizeof(ccmsg);
  cmsg = CMSG_FIRSTHDR(&msg);
  cmsg->cmsg_level = SOL_SOCKET;
  cmsg->cmsg_type = SCM_RIGHTS;
  cmsg->cmsg_len = CMSG_LEN(sizeof(fd));
  *(int*)CMSG_DATA(cmsg) = fd;
  msg.msg_controllen = cmsg->cmsg_len;
  msg.msg_flags = 0;
  rv = (sendmsg(unix_socket_fd, &msg, 0) != -1);
  if (rv) {
      if(close(fd)!=0) {
      }
  }
  return rv;
}
static int receive_fd(int fd)
{
  struct msghdr msg;
  struct iovec iov;
  char buf[1];
  int rv;
  int connfd = -1;
  char ccmsg[CMSG_SPACE(sizeof(connfd))];
  struct cmsghdr *cmsg;
  iov.iov_base = buf;
  iov.iov_len = 1;
  msg.msg_name = 0;
  msg.msg_namelen = 0;
  msg.msg_iov = &iov;
  msg.msg_iovlen = 1;
  msg.msg_control = ccmsg;
  msg.msg_controllen = sizeof(ccmsg);
  rv = recvmsg(fd, &msg, 0);
  cmsg = CMSG_FIRSTHDR(&msg);
  if (!cmsg->cmsg_type == SCM_RIGHTS) {
    fprintf(stderr, "got control message of unknown type %d\n",
        cmsg->cmsg_type);
    return -1;
  }
  return *(int*)CMSG_DATA(cmsg);
}
```

Accessing Data Using an Interface to the Data Management Component

Since I/O commands essentially read or write one or a set of sequentially addressed sectors, some overhead is eliminated by bypassing the network communications manager component 210 and the query management component 220 and having the storage command component 230 code make calls directly into the data management component 240. In certain embodiments, the I/O command format described in the Small Computer System Interface (SCSI) standard is followed, and the SCSI commands are mapped to one or more embedded storage function calls. Merely to enhance understanding, read and write function calls will be described herein, but embodiments are applicable to other function calls.

A logical I/O command is described by 5 parameters: (T, i, s, n, C). T describes whether the access type is a read or write. The second parameter i is a logical sector vector number, where a logical sector vector is a set of consecutive logical sectors. The third parameter s identifies a starting sector to be accessed within the logical sector vector i. The fourth parameter n indicates the number of consecutive sectors that are to be accessed. For a write I/O command, the parameter C contains the contents of the sectors to be updated for write access. For a read I/O command, the parameter C is the return parameter containing the sectors being read. Because the SCSI command set includes a SCSI read command and a SCSI write command, the access type parameter is not used with these SCSI commands.

A SCSI read command consists of four parameters: byteoffset (a starting byte); numofbytes (a total number of bytes to retrieve); databuff (a buffer holding data read from disk); and Sector Table Identifier. First, byteoffset and numofbytes are used to calculate the first and last record that are to be accessed in the sector table. The Sector Table Identifier is converted into a table name. Before the table may be accessed, the ScanOpen function is invoked to open a cursor for index scan, followed by a sequence of RowFetch function calls. The RowFetch function fetches one record at one time into the data buffer. After reaching the last row, the table cursor is closed.

The following is pseudocode for converting a SCSI read command to a data management function:

```
Read(int byteoffset, int numofbytes, char * databuff, char * LUN)
{
int mystartkey = byteoffset/size_of_1_row;
int myendkey = (byteoffset+numofbytes-1)/size_of_1_row;
......
IndexStartkey = &mystartkey;
IndexEndkey = &myendkey;
......
//prepare to access table
TableOpen( ......,
       IndexInfo, //first scan information with index range information
       TableInfo, //second scan information with table information
       ...... );
   for(int i=mystartkey; i<=myendkey; i++){
......
     RowFetch(......, databuff, ......); //retrieve one record into databuff
     databuff+=size_of_1_row;
......
   }
   TableClose(......); //done with the table access and close cursor
}
```

The storage command component 230 invokes the read command upon receiving an embedded storage function, and the data management component 240 executes the read function.

The conversion between a SCSI write command and data management component calls is similar to the conversion discussed with reference to the SCSI read command, except that the SCSI write command updates records, and the updates are committed. Before a table may be accessed, the ScanOpen function is invoked to open a cursor for index scan, followed by a sequence of RowFetch and RowUpdate function calls. The RowFetch function fetches one record at one time into the write buffer. New data is copied from the data buffer to the write buffer. The RowUpdate function is called to update the record with new record data in the write buffer. After reaching the last row, the table cursor is closed by calling the TableClose function. Finally the update is committed. The following is pseudocode for converting a SCSI write command to a data management function call.

```
Write(int byteoffset, int numofbytes, char * databuff, char * tablename)
{
int mystartkey = byteoffset/size_of_1_row;
int myendkey = (byteoffset+numofbytes-1)/size_of_1_row;
......
IndexStartkey = &mystartkey;
IndexEndkey = &myendkey;
......
//prepare to access table
  TableOpen( ......,
       IndexInfo, //first scan information with index range information
       TableInfo, //second scan information with table information
       ...... );
  for(int i=mystartkey; i<=myendkey; i++){
    RowFetch(......, writebuff, ......); //retrieve one record into writebuff
    Copy(writebuff, databuff, size_of_1_row); //copy new data into write buffer
    databuff+=size_of_1_row;
    RowUpdate(......, writebuff, ......); //update the record with new data
  }
  TableClose(......); //done with the table access and close cursor
  Commit( ); //commit each update
}
```

The storage command component 230 invokes the read command upon receiving an embedded storage function, and the data management component 240 executes the read function.

Sector Accumulation

Figure 5:
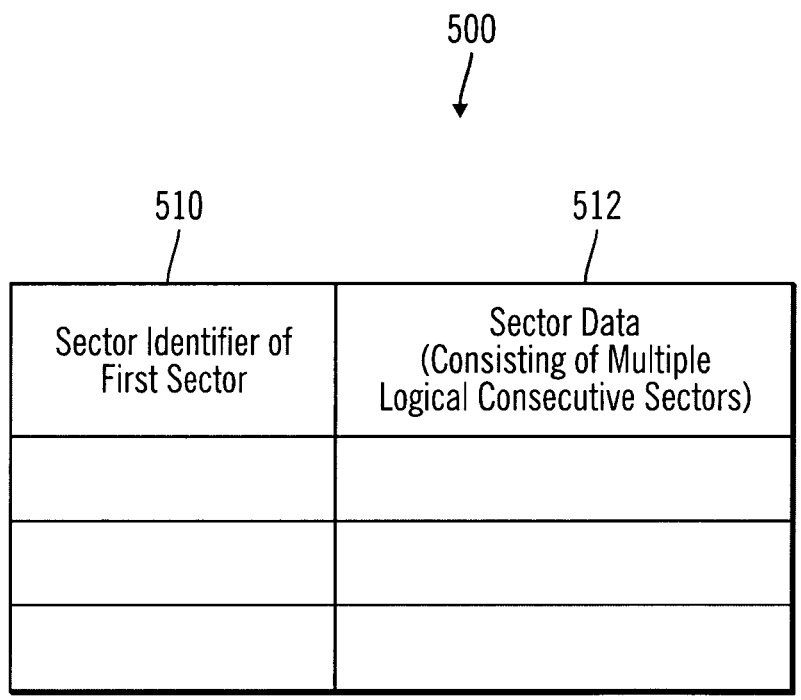
FIG. 5 illustrates a sector table in accordance with certain embodiments.

The data management component 240 incurs a per-record computational overhead. In particular, the number of read and write function calls for read and write I/Os is proportional to the number of records accessed. If the number of records processed by an I/O command is reduced, the computational cost is reduced. To achieve this, embodiments provide a new sector table schema in which multiple consecutive logical sectors are stored together within a single record. This may be referred to as sector accumulation. FIG. 5 illustrates a sector table 500 in accordance with certain embodiments. The sector table may be located in the physical I/O subsystem 140a, 140b. The sector table 500 includes two columns, a sector identifier column 510 and sector data column 512. A record of the sector table contains sector data consisting of multiple consecutive logical sectors and the sector identifier of the first sector. Using the sector table 500 achieves space efficiency since one sector identifier is stored for multiple sectors. The sector table 500 is configured to emulate a virtual storage device and maintain a plurality of records.

In a storage virtualization system, logical I/O commands are specified in terms of the addresses of logical sectors. The role of the virtualization engine is to translate these logical sector addresses to the actual physical sector addresses. In particular, a logical sector is often modeled as a triplet <LUN id, bnum, data>, where LUN id is the logical disk ID 1, bnum represents the sector number in that logical disk, and data is the sector data referred by bnum.

In certain embodiments, a physical sector vector consists of a set of 512 byte consecutive physical sectors from the same physical device. The entire physical storage, which may consist of several physical devices, may be modeled as r physical sector vectors. Embodiments define the r physical sector Vectors, n logical sector vectors, and their mapping using embedded data store manager objects.

Figure 6:
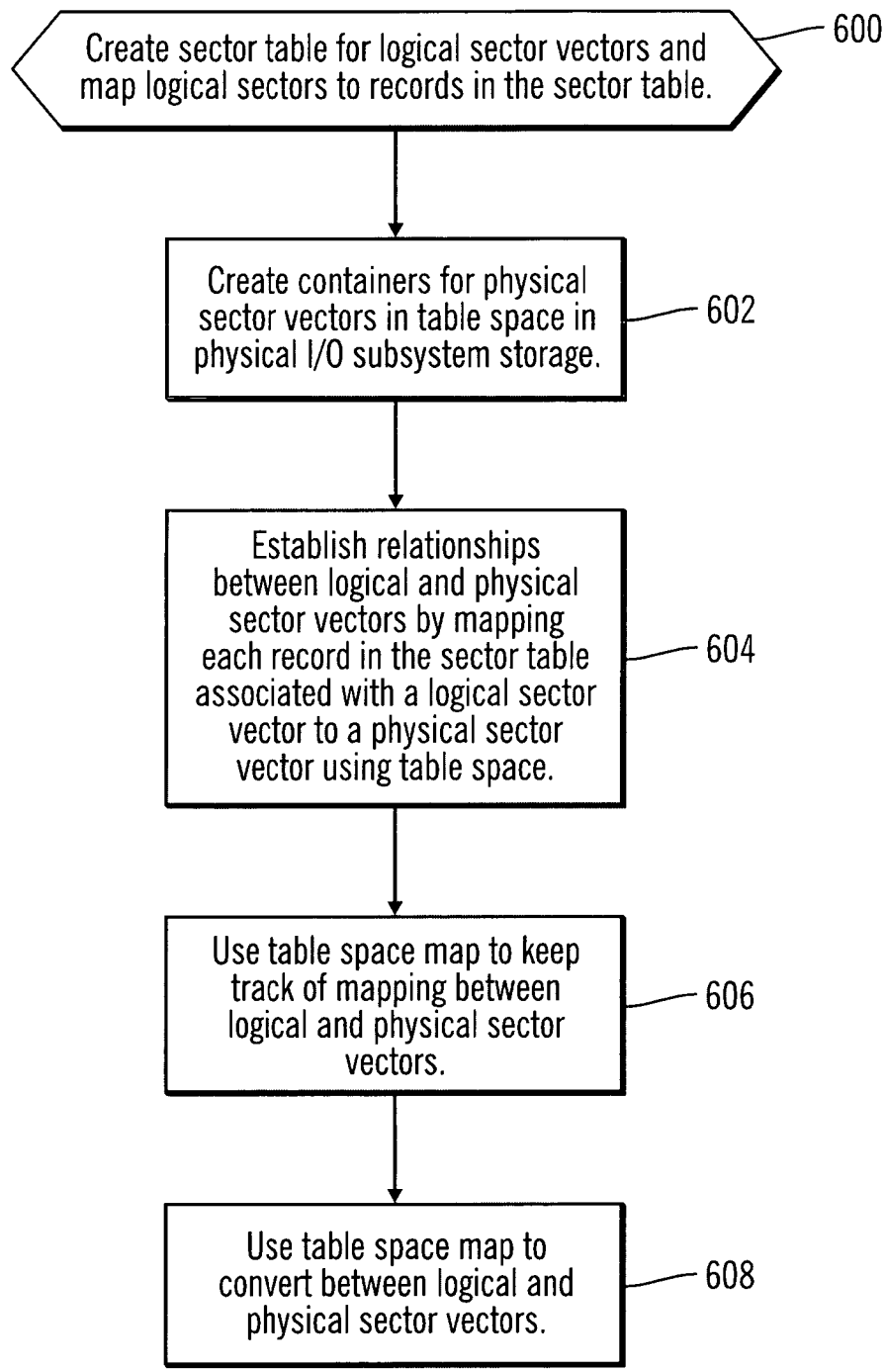
FIG. 6 illustrates logic for mapping logical to physical sectors in accordance with certain embodiments.

FIG. 6 illustrates logic for mapping logical to physical sectors performed by the data management component 240 in accordance with certain embodiments. In particular, a logical sector is mapped to a record in the sector table, and then the data management component 240 maps that record in the sector table to a physical sector in a table space.

Control begins at block 600 with the data management component 240 creating a sector table for logical sector vectors and mapping logical sectors to records in the sector table. In particular, for each logical sector vector BVi, a table sector vector TBVi is defined, whose table schema is (sector identifier, sector data). The field sector identifier is an integer, which uniquely identifies the first sector in the sector vector. The field sector data stores the content of the sector. When the sector table is created, logical sectors are mapped to records of the sector table.

In block 602, the data management component 240 creates containers for physical sector vectors in table space in physical I/O subsystem storage. In particular, each physical sector vector PVj is represented by a container CPVj. Containers may reside on files or on raw devices. The containers are deployed in order to allow the embedded data store manager 138a, 138b to manage the storage subsystems directly. In certain embodiments, a container consists of pages. Each page contains records, each of which represents a physical sector.

In block 604, the data management component 240 establishes relationships between logical and physical sector vectors by mapping each record in the sector table associated with a logical sector vector to a physical sector vector using the table space in which the containers reside. In particular, a table space is an embedded data store manager object that keeps track of the mapping between logical sector vectors and physical sector vectors. A table space consists of a set of containers, and each table space is dedicated to one TBV table. In certain embodiments, a table space may be a disk or a disk partition.

In block 606, the data management component 240 uses a table space map to keep track of the mapping between logical and physical sector vectors. That is, after the relationships between the logical sector vectors and the physical sector vectors are established via a table space, the mapping from logical sectors to physical sectors is maintained using the table space map. When a logical sector vector changes its residential physical sector vectors, the table space map is updated to reflect the new layout.

In block 608, the table space map is used to convert between logical sector vectors and physical sector vectors.

With sector accumulation, a tuple in TBVi becomes <j, bi j bi j+1 . . . bi j+k−1> by combining <j, bi j>, <j+1, bi j+1>, . . . , <j+k−1, bi j+k−1>. Again, TBV tables contain two fields, sector identifier, which identifies the first sector in a row, and sector data, which consists of k consecutive logical sectors. Embodiments determine an optimum value for k.

The data store manager 138a, 138b reads or writes records in units of data pages, whose size is often a multiple of four kilobytes (4 KBs). A data page consists of a page header, pointers to the records in the page, and data records, one each row. The former two data structures constitute page metadata. In certain embodiments, given that records may not span pages, to maximize data page utilization, as many sectors as possible are placed into one page and merged into one row. Therefore, the value of k is given by equation (1):

$$k=(\text{page size}-\text{page metadata size})/\text{sector size} \tag{1}$$

For instance, if the page size is 8 K bytes, page metadata is 400 bytes and sector size is 512 bytes, then k equals to 15. Note that sector accumulation also saves on the index space cost and the amount of record header in data pages, because of the reduced number of keys in a table. Note that for data access to any number of records in one page, the I/O cost is one page. Therefore, sector accumulation does not introduce extra I/O cost in certain embodiments (e.g., those in which logging is not considered). Also, in certain embodiments, because the embedded data store manager I/O access is based on a page (e.g., 4 KB, 8 KB, 16 KB or 32 KB) and one record cannot span pages, the number of sectors accumulated are those that can fit into one page (i.e., a 512-byte binary value).

Access to Sector Data

Different techniques may be used to store data. In one technique, data is stored in records of tables. For fixed length records, a record is located by using a sector identifier to locate a record in the sector table.

Figure 7:
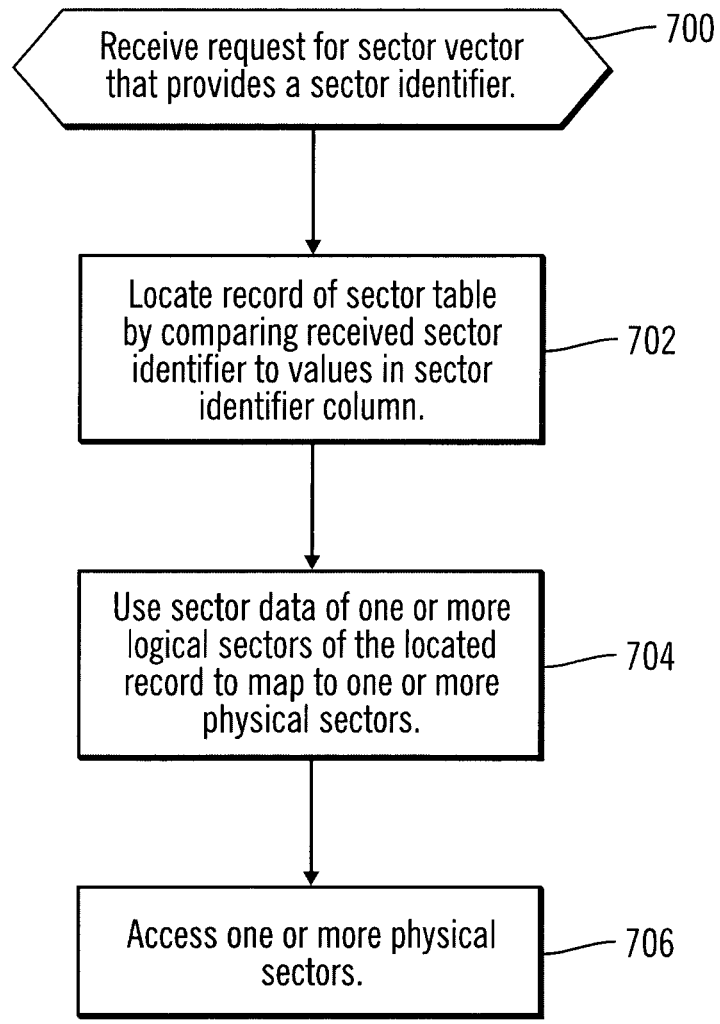
FIG. 7 illustrates logic for accessing a sector table having fixed length records in accordance with certain embodiments.

FIG. 7 illustrates logic for accessing a sector table having fixed length records in accordance with certain embodiments. Control begins at block 700 with receipt of a request for a sector vector that provides a sector identifier. In block 702, a record of the sector table is located by comparing the received sector identifier to values in the sector identifier column. In block 704, sector data of one or more logical sectors of the identified record is used to map to one or more physical sectors. In block 706, one or more physical sectors are accessed. The mapping uses the table space map described with reference to FIG. 6.

For variable length sectors (i.e., those for sector vectors that have been compressed or encrypted), embodiments utilize an index. For the sector table, an index may be built on the sector identifier column, and a sector could be accessed by traversing the index to locate the desired sector. Embodiments utilize identification properties (i.e., keys) of the records stored in the logical disk tables to provide special optimizations. First, the sector number field is given a fixed size of one integer. Second, updates do not move an index record since the sector identifiers remain unchanged. That is, when a sector is updated, the sector data filed of the sector table is modified, and not the sector identifier field, which is the key in the index. Based on these two properties, index records are laid out in such a way that their addresses may be computed using equations (2) and (3):

Each index record may be directly located using equations 3 and 4. Given the value of a key of an index record, r (i.e., where the key is a sector identifier of the sector table), the page number of the index page, PageNum(r), and the offset in the index page, Offset(r) are calculated using equations (2) and (3):

$$\text{PageNum}(r)=r/l+\text{metapage}; \tag{2}$$

$$\text{Offset}(r)=(r \bmod l) \times \text{sizeof}(\text{record})+\text{header}; \tag{3}$$

In equations (2) and (3), l is the number of index records in an index page, metapage represents the number of pages used to store meta data of the index, and header is the space consumed by header of an index page.

Thus, an index is created using the sector identifier of the sector table as the key. Then, a page number of the index for a particular key is determined by dividing the key by a number of index records in an index page to generate a first result and adding a number of pages used to store meta data of the index to the first result. Then, an offset of the key is determined by taking the key modulo the number of index records in the index page to generate a second result, multiplying the second result by a size of a record to generate a third result, and adding space consumed by a header of the index page to the third result. Once the index record is identified, the information in the index record is used to access the sector table.

Figure 8:
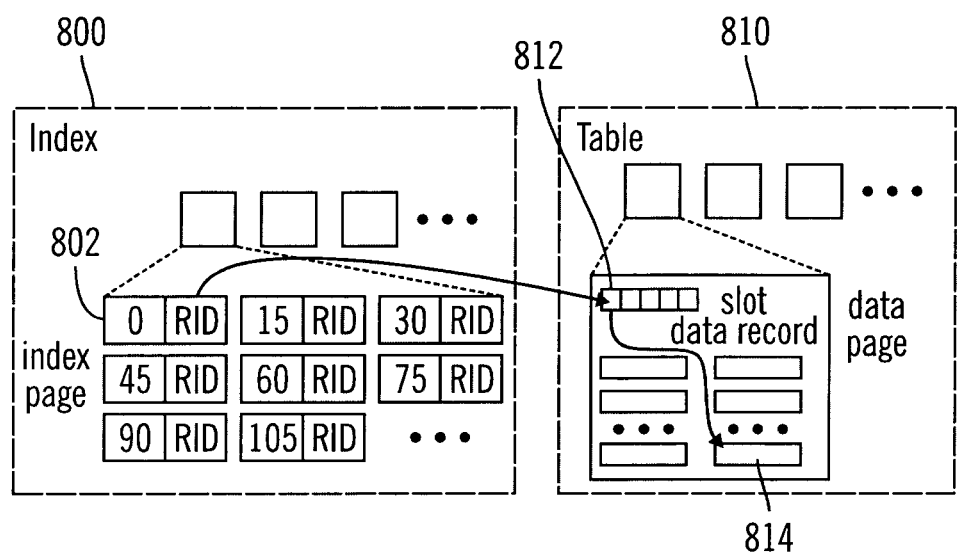
FIG. 8 illustrates a range clustered index for a sector table in accordance with certain embodiments.

FIG. 8 illustrates a range clustered index 800 for a sector table 810 in accordance with certain embodiments. A B-tree is eliminated by constructing a single level index layout. Analyzing the record structure in the index built on the sector identifier, it is seen that an index record on the leaf level consists of two fields: key sector identifier and Row Identifier (RID) (e.g., 802) pointing to the data page and the slot (e.g., 812) linking to the corresponding record (e.g., 814). On the leaf level, both the key sector identifier and RID have fixed size unique values, and the values between the maximum and minimum values of the key are presented. The access of an index entry may be found by equations (2) and (3), and the index structure is simply tabular. Therefore, binary search is eliminated, and the desired index page and index entry are directly accessed. This index structure may be referred to as a Range Clustered Index (RCI), and the access technique may be referred to as Index Direct Access (IDA). With this approach, index record access becomes less expensive since typical B-tree traversal may be avoided.

Figure 9:
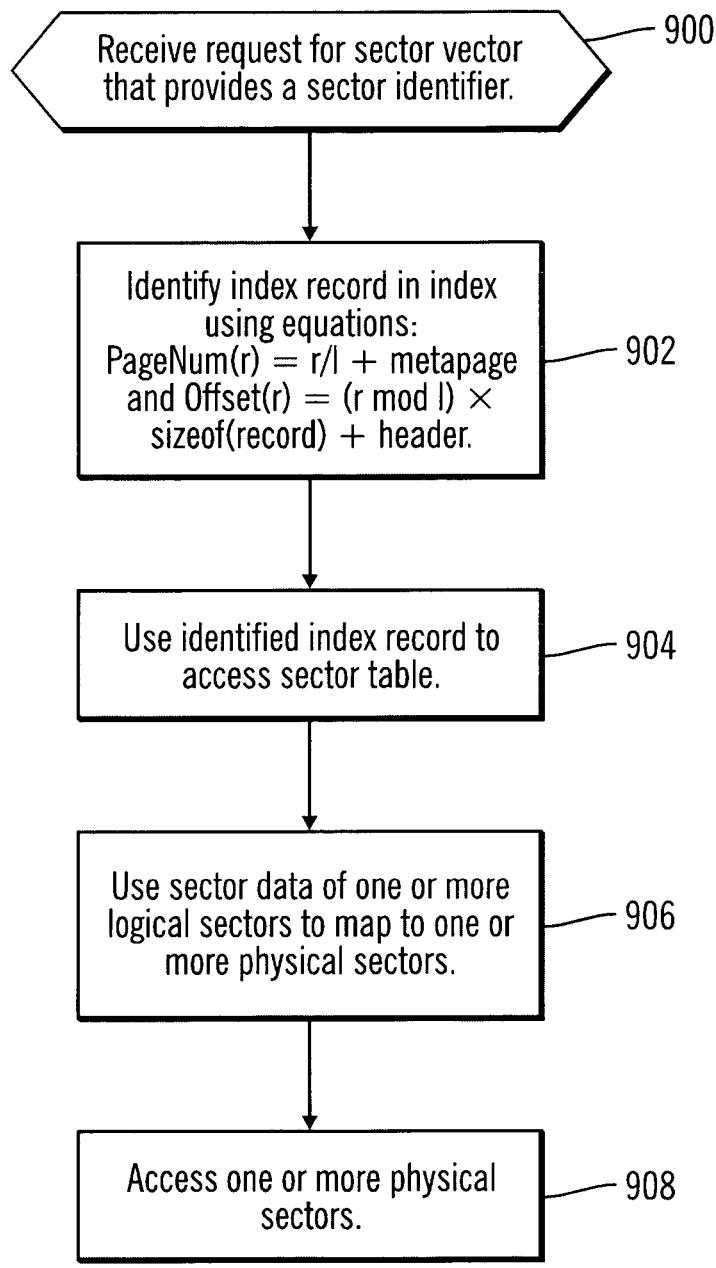
FIG. 9 illustrates logic for accessing a sector table having variable length records using an index in accordance with certain embodiments.

FIG. 9 illustrates logic for accessing a sector table using an index in accordance with certain embodiments. Control begins at block 900 with receipt of a request for a sector vector that provides a sector identifier, which is a key for an index to a sector table. In block 902, an index record in the index is identified using equations PageNum(r)=r/l+metapage and Offset(r)=(r mod l)×sizeof(record)+header. In block 904, the index record is used to access the sector table. In block 906, sector data of one or more logical sectors is used to map to one or more physical sectors. In block 908, one or more physical sectors are accessed. The mapping uses the table space map described with reference to FIG. 6.

For the Range Clustered Index, assume that the index height is h. The first RID read operation from a SQL execution involves O(1) index page accesses in RCI compared to O(h) in a B-tree. O(x) may be described as providing the order "O" of complexity, where the computation "x" within parenthesis describes the complexity. A LUN resize operation includes both increase in LUN size and decrease in LUN size. For both cases, a B-tree index inserts or deletes index records one by one, which is very expensive. Although there is a bulk loading utility to build index records in a bottom up approach, and therefore the whole process is much cheaper than individual inserts, intermediate nodes are still constructed. For RCI, new index records are appended to the current index structure or deleted index records are removed from the end of the index structure. If the change of table size is x %, the index operation cost of LUN resize is only O(x %×c).

In comparison to certain commercial virtualization software, embodiments take 90% of the total amount of CPU path length from the commercial virtualization software as measured by trace-driven tests.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The term logic may include, by way of example, software or hardware and/or combinations of software and hardware.

The logic of FIGS. 3, 6, 7, and 9 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3, 6, 7, and 9 may be implemented in software, hardware, programmable and non-programmable gate array logic or in some combination of hardware, software, or gate array logic.

Figure 10:
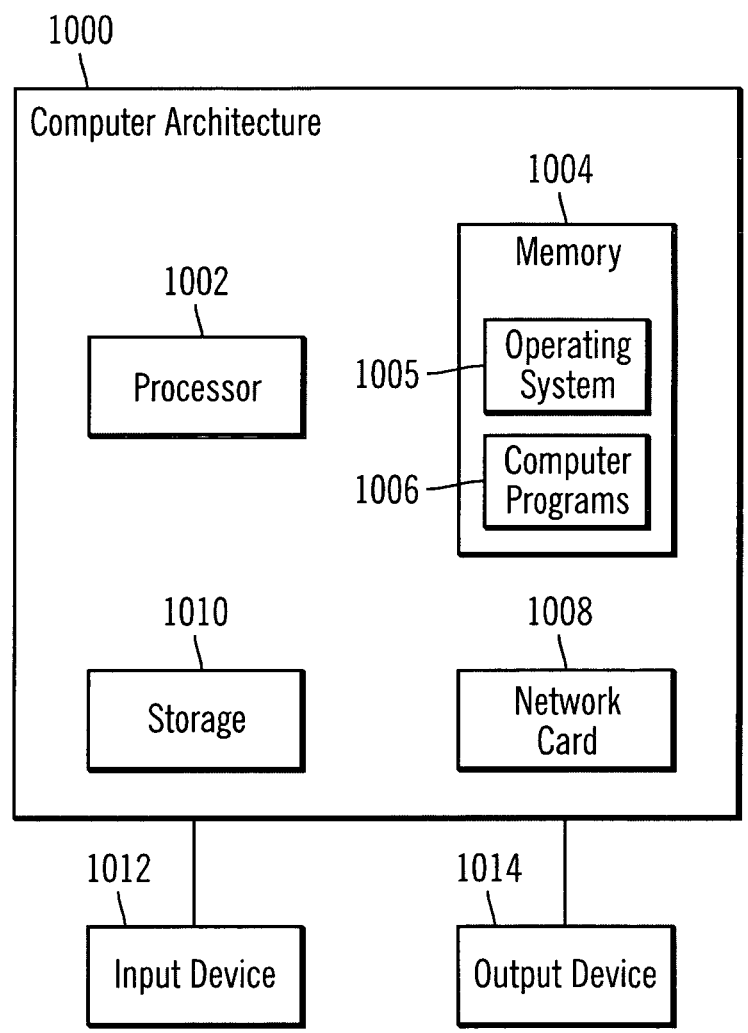
FIG. 10 illustrates an architecture of a computer system that may be used in accordance with certain embodiments.

FIG. 10 illustrates an architecture 1000 of a computer system that may be used in accordance with certain embodiments. Storage clients 110a, 110b, storage servers 120a, 120b, and/or embedded data store servers 130a, 130b may implement architecture 1000. The computer architecture 1000 may implement a processor 1002 (e.g., a microprocessor), a memory 1004 (e.g., a volatile memory device), and storage 1010 (e.g., a non-volatile storage area, such as magnetic disk drives, optical disk drives, a tape drive, etc.). An operating system 1005 may execute in memory 1004. The storage 1010 may comprise an internal storage device or an attached or network accessible storage. Computer programs 1006 in storage 1010 may be loaded into the memory 1004 and executed by the processor 1002 in a manner known in the art. The architecture further includes a network card 1008 to enable communication with a network. An input device 1012 is used to provide user input to the processor 1002, and may include a keyboard, mouse, pen-stylus, microphone, touch sensitive display screen, or any other activation or input mechanism known in the art. An output device 1014 is capable of rendering information from the processor 1002, or other component, such as a display monitor, printer, storage, etc. The computer architecture 1000 of the computer systems may include fewer components than illustrated, additional components not illustrated herein, or some combination of the components illustrated and additional components.

The computer architecture 1000 may comprise any computing device known in the art, such as a mainframe, server, personal computer, workstation, laptop, handheld computer, telephony device, network appliance, virtualization device, storage controller, etc. Any processor 1002 and operating system 1005 known in the art may be used.

The foregoing description of embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments can be made without departing from the spirit and scope of the invention, the embodiments reside in the claims hereinafter appended or any subsequently-filed claims, and their equivalents.

What is claimed is:

1. A method for accessing sector data, comprising:
   providing an embedded data store manager comprising a relational database management system and that includes a network communications manager component for performing translations, a query management component for processing queries, a storage command component for processing embedded storage functions, a data management component for generating physical Input/output (I/O) commands, and a buffer management component for executing the physical I/O commands;
   creating a sector table for one or more logical sector vectors, wherein the sector table stores multiple consecutive logical sectors within a single record;
   mapping each of the one or more logical sector vectors to a record in the sector table;
   creating one or more containers for one or more physical sector vectors in a table space;
   establishing one or more relationships between the one or more logical sector vectors and the one or more physical sector vectors using the table space;
   creating a table space map to enable mapping between the one or more logical sector vectors and the one or more physical sector vectors;
   mapping a logical I/O command to an embedded storage function; and
   under control of the storage command component:
      receiving the embedded storage function, wherein the embedded storage function is issued directly to the storage command component by bypassing the network communications manager component and the query management component;
      generating one or more data management functions in response to receiving the embedded storage function;
      in response to invoking the one or more data management functions to retrieve the sector data from the sector table in which multiple consecutive logical sectors are stored together within a single record, receiving the sector data from the sector table mapping the one or more logical sector vectors to the one or more physical sector vectors using the table space map from the data management component; and
      returning a response to a caller that issued the embedded storage function.

2. The method of claim 1, wherein the sector table includes a sector data column storing the multiple consecutive logical sectors and a sector identifier column storing a sector identifier of a first logical sector from associated multiple consecutive logical sectors.

3. The method of claim 1, wherein each of the one or more logical sector vectors is a set of consecutive logical sectors.

4. The method of claim 1, wherein the embedded storage function identifies a logical sector and wherein the one or more data management functions identify a corresponding physical sector.

5. The method of claim 1, wherein the sector table comprises fixed length records, wherein the embedded storage function provides a sector identifier, and further comprising:
   using the sector identifier to locate a record in the sector table.

6. The method of claim 1, wherein the sector table comprises variable length records and further comprising:
   creating an index on a sector identifier of the sector table;
   receiving a request that provides a sector identifier, wherein the sector identifier is a key into the index;
   determining a page number of a key of an index record in the index by dividing the key by a number of index records in an index page to generate a first result and adding a number of pages used to store meta data of the index to the first result; and
   determining an offset of the key by taking the key modulo the number of index records in the index page to generate a second result, multiplying the second result by a size of a record to generate a third result, and adding space consumed by a header of the index page to the third result; and
   using the offset to locate a record in the index.

7. The method of claim 1, wherein the caller is a storage server, and further comprising:
   exporting the embedded storage functions to the storage server.

8. An article of manufacture for accessing sector data, wherein the article of manufacture comprises a non-transitory computer readable medium storing code, and wherein the code when executed by a processor of a computer is operable to:
   provide an embedded data store manager comprising a relational database management system and that includes a network communications manager component for performing translations, a query management component for processing queries, a storage command component for processing embedded storage functions, a data management component for generating physical Input/output (I/O) commands, and a buffer management component for executing the physical I/O commands;
   create a sector table for one or more logical sector vectors, wherein the sector table stores multiple consecutive logical sectors within a single record;
   map each of the one or more logical sector vectors to a record in the sector table;
   create one or more containers for one or more physical sector vectors in a table space;
   establish one or more relationships between the one or more logical sector vectors and the one or more physical sector vectors using the table space;
   create a table space map to enable mapping between the one or more logical sector vectors and the one or more physical sector vectors;
   map a logical I/O command to an embedded storage function; and under control of the storage command component,
receive the embedded storage function, wherein the embedded storage function is issued directly to the storage command component by bypassing the network communications manager component and the query management component;
generate one or more data management functions in response to receiving the embedded storage function;
in response to invoking the one or more data management functions to retrieve the sector data from the sector table in which multiple consecutive logical sectors are stored together within a single record, receive the sector data from the sector table by mapping the one or more logical sector vectors to the one physical sector vectors using the table space map from the data management component; and
return a response to a caller that issued the embedded storage function.

9. The article of manufacture of claim 8, wherein the sector table includes a sector data column storing the multiple consecutive logical sectors and a sector identifier column storing a sector identifier of a first logical sector from associated multiple consecutive logical sectors.

10. The article of manufacture of claim 8, wherein each of the one or more logical sector vectors is a set of consecutive logical sectors.

11. The article of manufacture of claim 8, wherein the embedded storage function identifies a logical sector and wherein the one or more data management functions identify a corresponding physical sector.

12. The article of manufacture of claim 8, wherein the sector table comprises fixed length records, wherein the embedded storage function provides a sector identifier, and wherein the code when executed by the processor of the computer is operable to:
use the sector identifier to locate a record in the sector table.

13. The article of manufacture of claim 8, wherein the sector table comprises variable length records and wherein the code when executed by the processor of the computer is operable to:
create an index on a sector identifier of the sector table;
receive a request that provides a sector identifier, wherein the sector identifier is a key into the index;
determine a page number of a key of an index record in the index by dividing the key by a number of index records in an index page to generate a first result and adding a number of pages used to store meta data of the index to the first result; and
determine an offset of the key by taking the key modulo the number of index records in the index page to generate a second result, multiplying the second result by a size of a record to generate a third result, and adding space consumed by a header of the index page to the third result; and
use the offset to locate a record in the index.

14. The article of manufacture of claim 8, wherein the caller is a storage server, and wherein the code when executed by the processor of the computer is operable to:
export the embedded storage functions to the storage server.

15. A computer system for accessing sector data, comprising:
a processor;
storage coupled to the processor, wherein the storage stores code, and wherein the processor executes the code to perform operations, wherein the operations comprise:
providing an embedded data store manager comprising a relational database management system and that includes a network communications manager component for performing translations, a query management component for processing queries, a storage command component for processing embedded storage functions, a data management component for generating physical Input/output (I/O) commands, and a buffer management component for executing the physical I/O commands;
creating a sector table for one or more logical sector vectors, wherein the sector table stores multiple consecutive logical sectors within a single record;
mapping each of the one or more logical sector vectors to a record in the sector table; creating one or more containers for one or more physical sector vectors in a table space;
establishing one or more relationships between the one or more logical sector vectors and the one or more physical sector vectors using the table space;
creating a table space map to enable mapping between the one or more logical sector vectors and the one or more physical sector vectors;
mapping a logical I/O command to an embedded storage function; and
wherein the storage command component causes operations, wherein the operations comprise:
receiving the embedded storage function, wherein the embedded storage function is issued directly to the storage command component by bypassing the network communications manager component and the query management component;
generating one or more data management functions in response to receiving the embedded storage function;
in response to invoking the one or more data management functions to retrieve the sector data from the sector table in which multiple consecutive logical sectors are stored together within a single record, retrieving the sector data from the sector table by mapping the one or more logical sector vectors to the one or more physical sector vectors using the table space map from the data management component; and
returning a response to a caller that issued the embedded storage function.

16. The system of claim 15, wherein the sector table includes a sector data column storing the multiple consecutive logical sectors and a sector identifier column storing a sector identifier of a first logical sector from associated multiple consecutive logical sectors.

17. The system of claim 15, wherein each of the one or more logical sector vectors is a set of consecutive logical sectors.

18. The system of claim 15, wherein the embedded storage function identifies a logical sector and wherein the one or more data management functions identify a corresponding physical sector.

19. The system of claim 15, wherein the sector table comprises fixed length records, wherein the embedded storage function provides a sector identifier, and wherein the operations further comprise:
using the sector identifier to locate a record in the sector table.

20. The system of claim 15, wherein the sector table comprises variable length records and wherein the operations further comprise:
creating an index on a sector identifier of the sector table;
receiving a request that provides a sector identifier, wherein the sector identifier is a key into the index;

determining a page number of a key of an index record in the index by dividing the key by a number of index records in an index page to generate a first result and adding a number of pages used to store meta data of the index to the first result; and determining an offset of the key by taking the key modulo the number of index records in the index page to generate a second result, multiplying the second result by a size of a record to generate a third result, and adding space consumed by a header of the index page to the third result; and using the offset to locate a record in the index.

21. The system of claim 15, wherein the caller is a storage server, and wherein the operations further comprise:

exporting the embedded storage functions to the storage server.

22. The system of claim 15, wherein an embedded data store server includes the embedded data store manager, and wherein the embedded data store server is coupled to a storage server.

23. The system of claim 22, the data management component executes the data management functions to retrieve the sector data from the sector table accessed by the buffer management component.

* * * * *